No. 890,834. PATENTED JUNE 16, 1908.
J. M. ATTERBURY.
HALTER OR HEAD STALL FOR BREACHY STOCK, &c.
APPLICATION FILED NOV. 29, 1907.
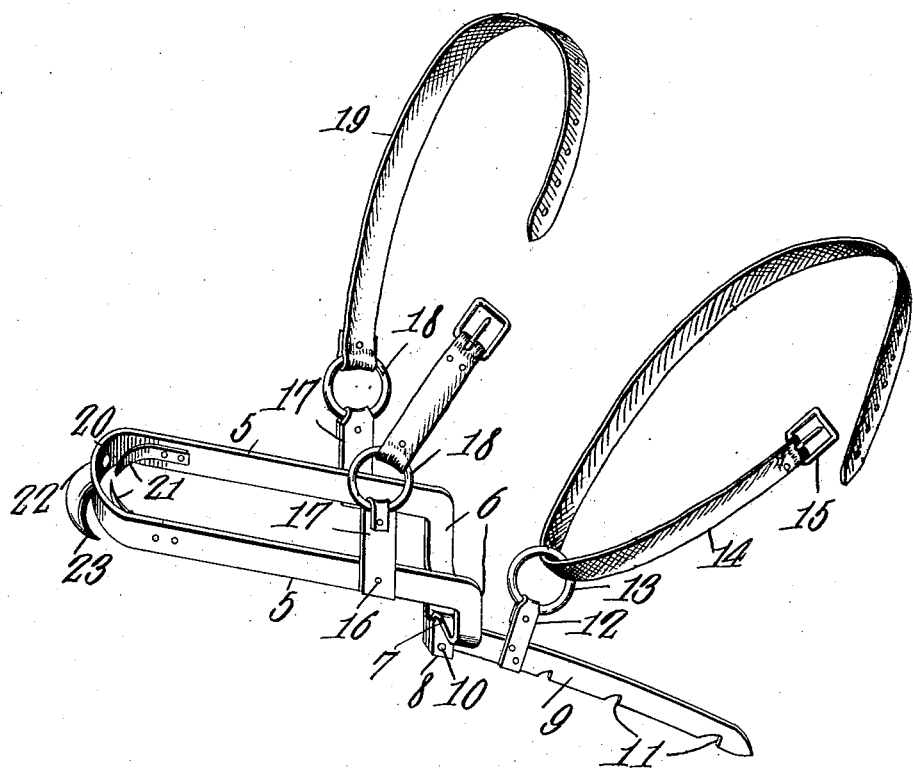
Witnesses:
P. W. Pope.
James B. Journey
Inventor:
John M. Atterbury

UNITED STATES PATENT OFFICE.

JOHN M. ATTERBURY, OF NEVADA, MISSOURI.

HALTER OR HEAD-STALL FOR BREACHY STOCK, &c.

No. 890,834.   Specification of Letters Patent.   Patented June 16, 1908.

Application filed November 29, 1907. Serial No. 404,473.

*To all whom it may concern:*

Be it known that I, JOHN M. ATTERBURY, of the city of Nevada, Vernon county, State of Missouri, have invented a new and useful article for preventing stock from breaking through fences of all kinds, the same to be known as a halter or head-stall for breachy stock, together with a weaning-device attachment and a self-sucking-device attachment; and I do hereby declare that the following is a full, clear, and exact description of the same, as will more fully appear by the accompanying drawing, and which is herein referred to.

This invention relates to animal pokes and has for its object to provide a comparatively simple and inexpensive device of this character for preventing unruly cows, horses and other live stock from breaking through fences and other barriers.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawing forming a part of this specification there is represented a perspective view of an animal poke constructed in accordance with my invention.

Similar numerals of reference indicate corresponding parts in all of the figures of the drawings.

The improved animal poke forming the subject matter of the present invention comprises a supporting frame preferably formed of a strip of flat metal and designed to embrace the nose of an animal with the side members 5 of the frame disposed on opposite sides of the animal's jaws. The side members 5 at the rear end of the frame are bent downwardly to form depending arms 6, the intermediate portions of which are offset at 7 and extended inwardly to produce a recess or socket to accommodate the throat of the animal, the lower end of the arms 6 being extended downwardly to form spaced attaching fingers 8 for the reception of the adjacent end of a lever 9. The lever 9 is rigidly secured to the attaching fingers 8 by means of bolts, rivets or similar fastening devices 10, while the lower longitudinal edge of the lever is formed with one or more notches 11 for engagement with the wires of a fence or other barrier when the animal attempts to break through the latter.

Rigidly secured to and extending from the lever 9 at a point adjacent the attaching fingers 8 is a metal strap 12 having a loop formed in the end thereof for the reception of the ring 13, this ring being adapted to receive a strap 14 which is designed to embrace the neck of the animal and is provided with a suitable buckle 15 by means of which the strap may be fastened in position on the animal's neck. Pivotally mounted at 16 on the side members 5 are spaced uprights 17 carrying rings or loops 18 to which are attached the adjacent ends of a head strap 19. Extending inwardly from the forward end 20 of the supporting frame and preferably curved to conform to the curvature of said frame are spring fingers 21, the free ends of which are spaced apart and adapted to bear against the nose of the animal so as to normally prevent the spur or prod 22 from piercing or pricking the animal's nose. The spur 22 projects laterally from the forward end 20 of the supporting frame while the point 23 of said spur projects laterally beneath the frame but terminates short of the spring fingers 21, so that under normal conditions the point 23 of the spur or hook will be spaced from the animal's nose. It will thus be seen that should the animal attempt to jump over or break through a fence or other barrier the notches 11 will engage the wires of the fence and thus tilt the supporting frame on the pivot or fulcrum 16, thereby forcing the front end of the supporting frame downwardly and causing the point of the spur 22 to prick the animal's nose, the spring 21 yielding laterally to permit downward movement of said frame. As soon as the pressure on the lever 9 is released the weight of said lever will cause the free end of the supporting frame to automatically assume its normal position with the springs 21 resting against the nose of the animal and the point of the spur in position to engage the animal's nose when a rearward pressure is again exerted on said lever.

The pokes may be made of different sizes and shapes and as many prods or spurs may be secured to the forward end of the frame as is found desirable.

From the foregoing description it will be seen that there is provided an extremely simple, inexpensive and efficient device admirably adapted for the attainment of the ends in view.

Having thus described the invention what is claimed is:

1. An animal poke comprising a frame, a lever secured to one end of the frame, a spur secured to the opposite end of said frame, a neck strap secured to the lever, a head strap, and a pivotal connection between the head strap and frame.

2. An animal poke comprising a frame, a spur secured to the forward end of the frame, a lever rigidly secured to the rear end of the frame, a neck strap carried by the lever, a head strap, and a pivotal connection between the head strap and an intermediate portion of the frame.

3. An animal poke comprising a frame, a spur secured to the forward end of the frame, springs spaced laterally from the forward end of said frame, a lever rigidly secured to the frame, a neck strap carried by the lever, uprights pivotally mounted on the frame, and a head strap carried by the uprights.

4. An animal poke comprising a frame having spaced side members the ends of which are bent downwardly to form depending arms, a lever rigidly secured to the frame between said arms, a spur secured to the forward end of the frame, a neck strap carried by the lever, uprights pivotally mounted on the side members of the frame, and a head strap connected with the uprights.

5. An animal poke comprising a supporting frame having spaced side members, the ends of which are bent downwardly to form depending arms having their intermediate portions offset and thence extended downwardly to form terminal attaching fingers, a lever disposed between and rigidly secured to the attaching fingers, a neck strap carried by the lever, a spur secured to the forward end of the frame, uprights pivotally mounted on the side members of the frame, and a head strap carried by the uprights.

6. An animal poke comprising a frame, a spur secured to the forward end of the frame and having its free end curved laterally beneath said frame, a lever rigidly secured to the rear end of the frame and having a series of notches formed in one longitudinal edge thereof, a neck strap secured to the lever, spaced uprights pivotally mounted on an intermediate portion of the frame, a head strap connected with the uprights, and spring fingers secured to the forward end of the frame and adapted to bear against the animal's nose.

7. An animal poke comprising a frame having spaced side members the rear ends of which are offset and thence bent downwardly to form depending attaching fingers, a lever disposed between and rigidly secured to the attaching fingers, a neck strap carried by the lever, uprights pivotally connected with the opposite sides of the frame, a neck strap carried by the uprights, spring fingers secured to the frame and spaced from the forward end thereof, and a spur the point of which extends beneath the frame and terminates short of the spring fingers.

JOHN M. ATTERBURY.

Witnesses:
J. P. STEPHENSON,
S. L. ELKINS.